Aug. 10, 1954     J. J. KLEIN     2,686,138
METHOD FOR CLEANING DIFFUSER PLATES
Filed Sept. 15, 1951
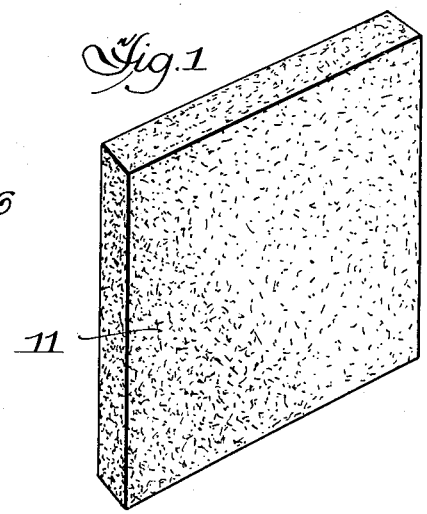
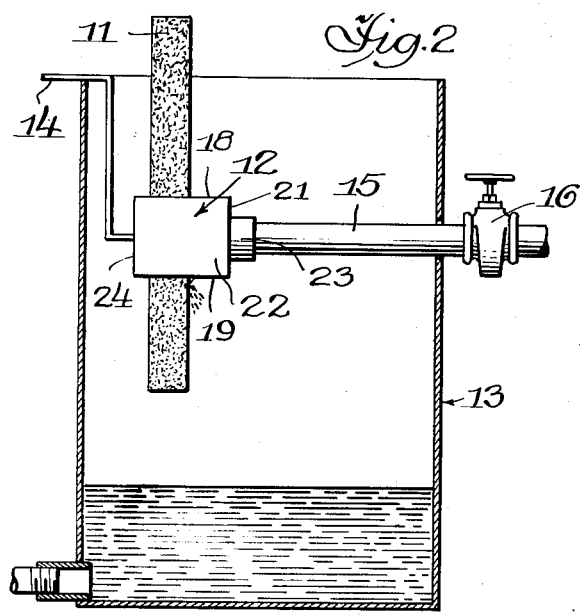
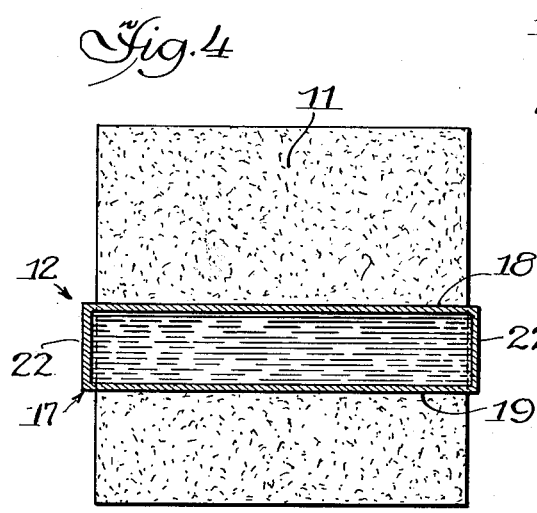
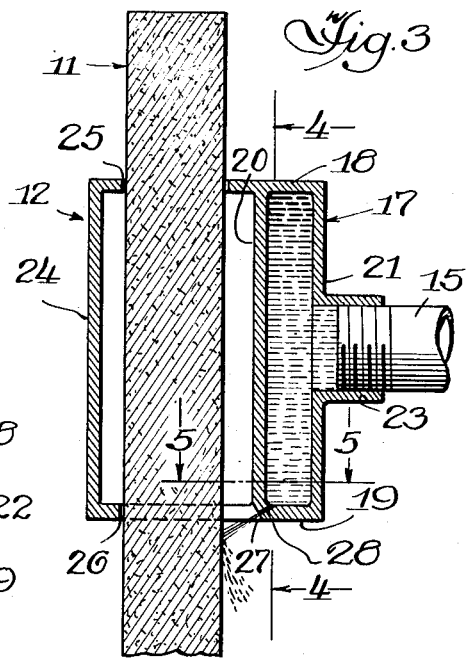
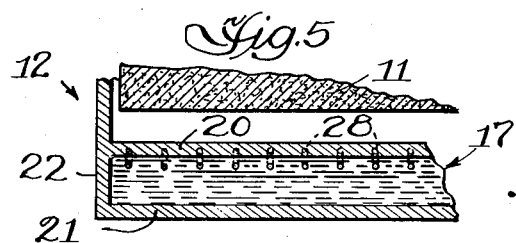
Inventor,
Joseph J. Klein,
By: Schneider & Dressler,
Attys

UNITED STATES PATENT OFFICE 2,686,138

METHOD FOR CLEANING DIFFUSER PLATES

Joseph J. Klein, Glencoe, Ill., assignor to Chicago Pump Company, a corporation of Delaware Application September 15, 1951, Serial No. 246,855

5 Claims. (Cl. 134—15)

This invention relates to a method and apparatus for cleaning diffuser plates used for the aeration of liquids or for the dispersion of gases or vapors therein.

The cleaning of diffuser plates presents a substantial problem in the operation of plants employing such plates, for example plants engaged in the activated sludge process of treating sewage. The plates employed are porous plates usually formed of a material such as grains of fused crystalline aluminum oxide held together with ceramic binders. They also may be formed of any porous ceramic material or other suitable porous material. There are tortuous passageways between the grains of aluminum oxide or other porous material so that air or gas may be diffused through the plate. When used in the activated sludge process, in course of time such plates become badly contaminated with dirt, oils, greases, organic matter and other solid materials. This foreign material clogs the minute pores of the plate and the pressure will drop across the porous medium causing the volume of flow for any given input air pressure to be seriously reduced. As time passes, more and more foreign material will accumulate in the pores of the plate and the efficiency will become still further impaired. Decrease in efficiency of the plate results in power loss in the diffusion system. Unless the diffuser plates are periodically cleaned to restore the pores to their original condition, the plates may become so inefficient that they cannot be used and must be destroyed. In fact, prior to this invention, it was frequently impossible to economically clean diffuser plates after they had once become clogged.

The methods and apparatus for cleaning such diffuser plates heretofore in common use have required the expenditure of extensive time by trained personnel for adequate cleaning. In addition to the time required, the methods heretofore employed in the prior art frequently necessitated the use of strong acids or alkaline cleaning solutions, boiling, introduction of chlorine into the diffusing system, introduction of expensive solvents and often such drastic measures as high temperature flames to burn out accumulated solids and sandblasting to remove material which had accumulated on the exterior surfaces of the plates.

My invention provides a method and apparatus whereby the plates may be cleaned rapidly and inexpensively. The method includes as an essential step the progressive movement of the plate relative to a plurality of high velocity water jets which impinge against one side of the plate from a direction which forms with the plate in its direction of travel an angle of less than 90°.

By the method and apparatus of the present invention, the amount of labor required in the cleaning of the plates is made small. Furthermore, the present invention completely eliminates the use of strong and substantially harmful cleaning solutions in the cleaning of such diffuser plates. The apparatus for cleaning such plates in accordance with the present invention is extremely simple and inexpensive both to manufacture and to operate.

Other advantages of the present invention will be apparent upon reading the specification, which describes a preferred embodiment of my invention, taken in conjunction with the accompanying drawings in which:

Figure 1 is a perspective view of a porous diffuser plate;

Fig. 2 is a side elevational view of the apparatus employed in the present invention with the tank being shown in section;

Fig. 3 is a sectional view, on an enlarged scale, showing the spray mechanism;

Fig. 4 is a sectional view taken along lines 4—4 of Fig. 3; and

Fig. 5 is a sectional view taken along lines 5—5 of Fig. 3.

Referring to the drawings, the diffuser plate 11 which is to be cleaned consists of a block of ceramic or other suitable porous material. A type of diffuser plate commonly in use consists of a rectangular plate having a width of one foot, a length of one foot and a thickness of about one inch. Foreign material will accumulate not only in the interior pores of the plate but will also block diffusion by covering the outer surfaces of the plate with sticky, gummy residues.

In my process, the exterior of the plate is first cleaned by spraying it with water to flush away the exterior soil. This spraying may be done either with a common hose or with an apparatus such as will be presently described. After the preliminary washing operation, the plate is then soaked in detergent composition containing a surface-active agent for the purpose of loosening the soil in the pores in the interior of the plate. This soaking is preferably continued for about ten to fifteen hours, but a shorter time may be employed if the plate is only slightly soiled.

Any well known type of detergent composition is suitable for use as a bath in loosening the soil present in the pores of the plate. A cationic, anionic or non-ionic surface active agent may be employed as the sole active constituent of a water solution, but improved results are achieved by the addition of a detergent assistant. In cases where the soil adhering to the pores of the plate is easily removed, a solution of a detergent assistant itself may have sufficient detergent action to be satisfactory for use as the detergent composition.

The preferred detergent compositions include a surface-active agent which is non-sudsing or has only low sudsing properties, preferably a non-ionic detergent such as that formed by reacting tall oil fatty acids with ethylene oxide. One such detergent is commercially known as MXP, sold by Monsanto Chemical Co. Other suitable surface-active agents are, for example: a sodium alkyl aryl sulfonate, such as is sold by Allied Chemical & Dye Corp. under the name Naccolene F or Naccolene E; a fatty alcohol sulfate, such as is sold by E. I. du Pont de Nemours Co. under the name Duponol DLS; the dioctyl ester of sodium sulfosuccinic acid, such as is sold by American Cyanamid & Chemical Corp. under the name Aerosol OT; or a mixed fatty acid ($C_{10}$—$C_{16}$) alkylolamine condensate such as is sold by Ninol Laboratories under the name Ninol 400. It will be understood that this listing constitutes only a small fraction of the surface-active agents which may be employed in the detergent composition, any of the surface-active agents well known for analogous uses giving satisfactory results.

The detergent or detergent assistant which may be used in the detergent composition may be, for example: anhydrous or hydrated sodium metasilicate, such as that sold, respectively, as Drymet and Escomet by Cowles Detergent Co.; sodium hexametaphosphate, such as that sold as Calgon by Calgon, Inc.; tetrasodium pyrophosphate, such as sold by Monsanto Chemical Co. under the name Phosphatex; trisodium phosphate; sodium triphosphate; sodium carbonate; sodium metaphosphate, and the like.

The preferred detergent composition for the practice of the method of the invention consists of a water solution of 2% MXP (a product of reaction of tall oil fatty acids with ethylene oxide, mentioned above) and 2% sodium metasilicate.

Following the detergent bath, all portions of the exterior surface of the diffuser plate are then sprayed with water jets having a velocity of at least 40 feet per second and preferably of a velocity greater than 80 feet per second. The greater the velocity of the water, the more efficient will be the cleaning of the plate.

By using the method of the present invention, diffuser plates may be cleaned in as little time as thirty to sixty seconds of application of the water spray. Such a short application of water jets has been found to restore even badly soiled diffuser plates employed in the activated sludge and sewage process, to their original pressure drop conditions after the plates have been preliminarily washed and bathed in a suitable detergent composition. When the plate is highly soiled, it is desirable to preliminarily wash the plate with high velocity jets before soaking it in the detergent composition in the same manner that it is washed with high velocity jets after it has been soaked in detergent composition.

The apparatus which I employ in spraying the diffuser plates consists of a spray jet assembly, generally indicated by the numeral 12, supported in the interior of a tank 13 by a support bracket 14 which rests on the top edge of tank 13. Diametrically opposed to the support bracket 14 is an inlet pipe 15 which supplies water under pressure to the spray jet assembly 12. A manually operated valve 16 serves to control the flow of water through pipe 15 and spray jet assembly 12.

As shown in Figs. 3–5, the spray jet assembly consists of a fluid chamber 17 completely enclosed by a top wall 18, bottom wall 19, rear wall 20, front wall 21 and side walls 22. The inlet pipe 15 leads into front wall 21 and is suitably secured into a neck portion 23. The remainder of the spray jet assembly serves merely as a guide for the diffuser plate and comprises a hollow shell 24 having apertures 25 and 26 at its top and bottom respectively.

Bottom wall 19 and rear wall 20 of the fluid chamber are joined together by a wall 27 having an exposed bevelled surface. A plurality of jet orifices 28 are drilled in a downward direction through wall 27 along its entire length. When a diffuser plate is positioned in guide shell 24, water forced through jet orifices 28 will strike the plate at an angle. It is preferable to spray the plate at an angle so that soil which is contained on the surface of the plate will be washed off the plate rather than forced into the pores thereof as, for example, when the spray would be at right angles to the plate. On the other hand, if too great an angle is employed, there will be insufficient pressure directed inwardly into the pores so that the plate cannot be properly cleaned. It has been found that the inclination of the jet orifices should be between 90° and 45° from the vertical axis of the fluid chamber. The preferred angle is 60° from the vertical.

The number of jets or orifices 28 is sufficient to insure complete coverage of the surface of the diffuser plate inserted through apertures 25 and 26 of guide shell 24. If too many apertures are provided more water pressure must be supplied to furnish the necessary force in spraying the liquid against the diffuser plate.

In operation, the plate 11 is moved slowly downwardly through spray jet assembly 12 and the jets 28 will spray water at a high velocity onto one side of the diffuser plate. The high velocity spray will force its way through the plate, cleaning the pores as it travels therethrough, and a portion of the fluid will emerge from the opposite side of the plate. It may be advisable to repeat the operation twice. In the second spraying operation the plate is turned around so that the side not sprayed during the first spraying will be sprayed during the second spraying.

An efficient structure is one in which the jet orifices are approximately $\frac{3}{32}$ inch in diameter, and where the water pressure is maintained in the inlet pipe at approximately 40 to 60 pounds per square inch. The water velocity emerging from the jet orifice is about 80 feet per second. Efficiency can be increased if the water pressure in the inlet pipe is increased to 100 pounds per square inch or even greater, with consequent increase in the velocity of the jets of water.

In operation, a suitable clamp (not shown) is attached to diffuser plate 11 and the diffuser plate is slowly lowered through apertures 25 and 26 until the entire surface of the plate has been sprayed by the jets.

In a typical practice of the method of my invention, the plates are first sprayed down with an ordinary hose as the first step of the operation; plates which are exceedingly soiled being instead passed through the jet apparatus illustrated. Thereafter, the plates are soaked overnight in a solution of 2% MXP and 2% sodium metasilicate in water (referred to above). The plate is then lowered through the assembly 12 in such time that the entire surface of the plate has been sprayed in about 60 seconds. The plate is then turned around and the other side is sprayed in the same manner. Such cleaning will, in a majority of the cases, restore the diffuser plate substantially to its original operating efficiency.

There has been described above the general principles and practices of the invention in conjunction with a particular embodiment thereof in order to aid in the understanding of the invention. It is to be understood that the particular embodiment illustrated is not in itself definitive of the scope of the invention. The invention is not restricted to the exact structure above described nor to the precise steps described since variations and modifications may be made therein without departing from the spirit or scope of the invention.

I claim:

1. A method of cleaning a diffuser plate comprising the steps of progressively moving the plate relative to a plurality of water jets having a velocity greater than 40 feet per second, spraying one side of said plate with said water jets in the direction of relative motion of the plate at an angle of approximately 60° from the vertical to clean the outer surface of the plate, soaking the plate in a detergent to loosen soil in the pores of the plate, and again spraying one side of the plate with said water jets in the manner aforesaid to flush the soil so loosened through the pores of the plate.

2. A method of cleaning a diffuser plate comprising the steps of progressively moving the plate relative to a plurality of water jets having a velocity greater than 40 feet per second, spraying one side of said plate with said water jets in the direction of relative motion of the plate at an angle of approximately 60° from the vertical, they spraying the other side of said plate with said water jets in the direction of relative motion of the plate at an angle of approximately 60° from the vertical, soaking the plate in a detergent to loosen soil in the pores of the plate, and again spraying first one side and then the other side of the plate with said water jets in the manner aforesaid to flush soil so loosened through the pores of the plate.

3. A method of cleaning a diffuser plate comprising the steps of progressively moving the plate relative to a plurality of water jets having a velocity greater than 40 feet per second, spraying one side of said plate with said water jets in the direction of relative motion of the plate at an angle less than 90° and greater than 45° from the vertical to clean the outer surface of the plate, soaking the plate in a detergent to loosen soil in the pores of the plate, and again spraying one side of the plate with said water jets in the manner aforesaid to flush the soil so loosened through the pores of the plate.

4. A method of cleaning a diffuser plate comprising the steps of soaking the plate in a detergent composition to loosen soil in the pores of the plate, progressively moving the plate relative to a plurality of water jets having a velocity greater than 40 feet per second, and spraying one side of said plate with said water jets in the direction of relative motion of the plate at an angle of less than 90° and greater than 45° from the vertical to flush the soil through the pores of the plate.

5. A method of cleaning a diffuser plate comprising the steps of soaking the plate in a detergent to loosen soil in the pores of the plate, moving the plate relative to a plurality of water jets having a velocity greater than 40 feet per second, spraying one side of said plate with said water jets in the direction of relative motion of the plate at an angle of less than 90° and greater than 45° from the vertical, then spraying the other side of said plate with said water jets in the direction of relative motion of the plate at an angle of less than 90° and greater than 45° from the vertical.

References Cited in the file of this patent

UNITED STATES PATENTS

| Number | Name | Date |
|---|---|---|
| 1,430,039 | Stoop | Sept. 26, 1922 |
| 1,688,654 | Quant | Oct. 23, 1928 |
| 1,858,437 | Dufford | May 17, 1932 |
| 1,907,875 | Robertson | May 9, 1933 |
| 2,399,205 | Campbell | Apr. 30, 1946 |
| 2,616,437 | Secor | Nov. 4, 1952 |